Dec. 15, 1936.  H. H. RICHARDSON  2,064,218
APPARATUS FOR DISPLAYING AERIAL SIGNS
Filed Jan. 4, 1934  4 Sheets-Sheet 1
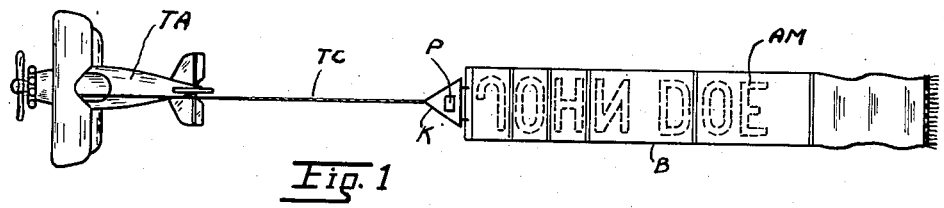
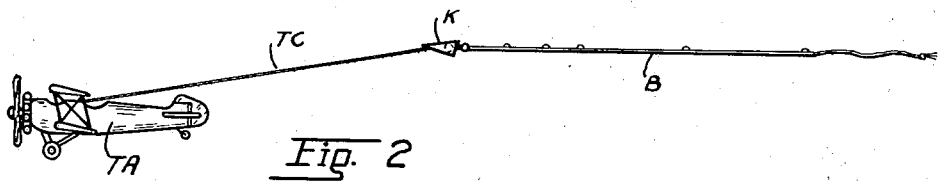
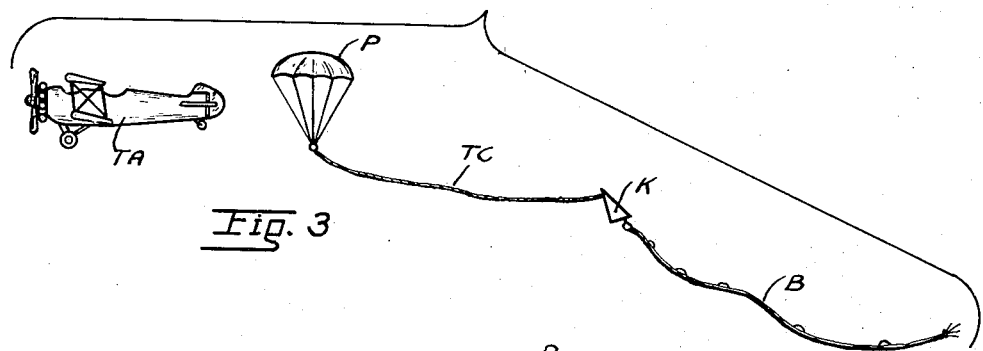
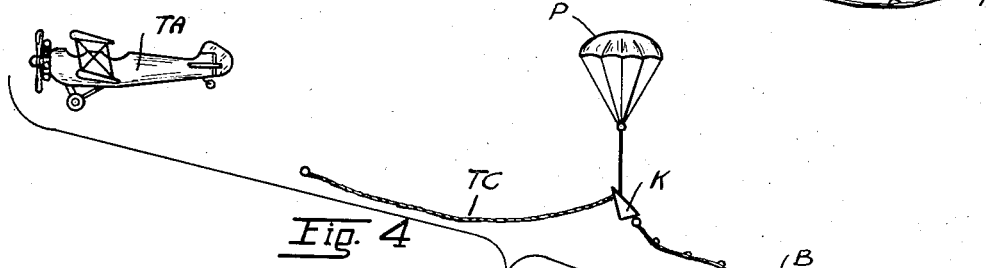
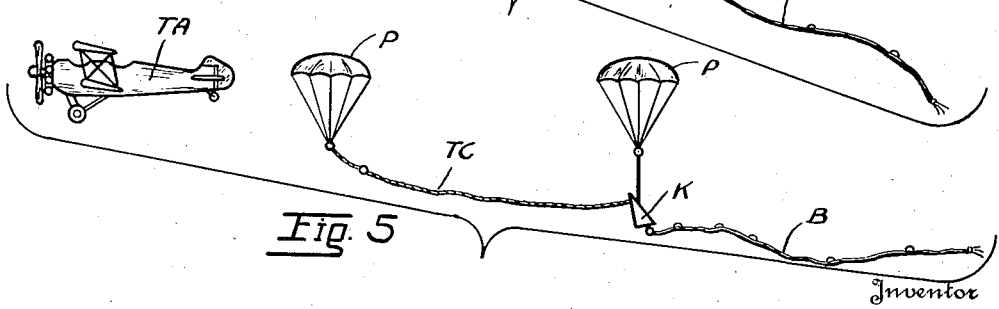
Inventor
Henry H. Richardson
By W. E. Sherwood
Attorney

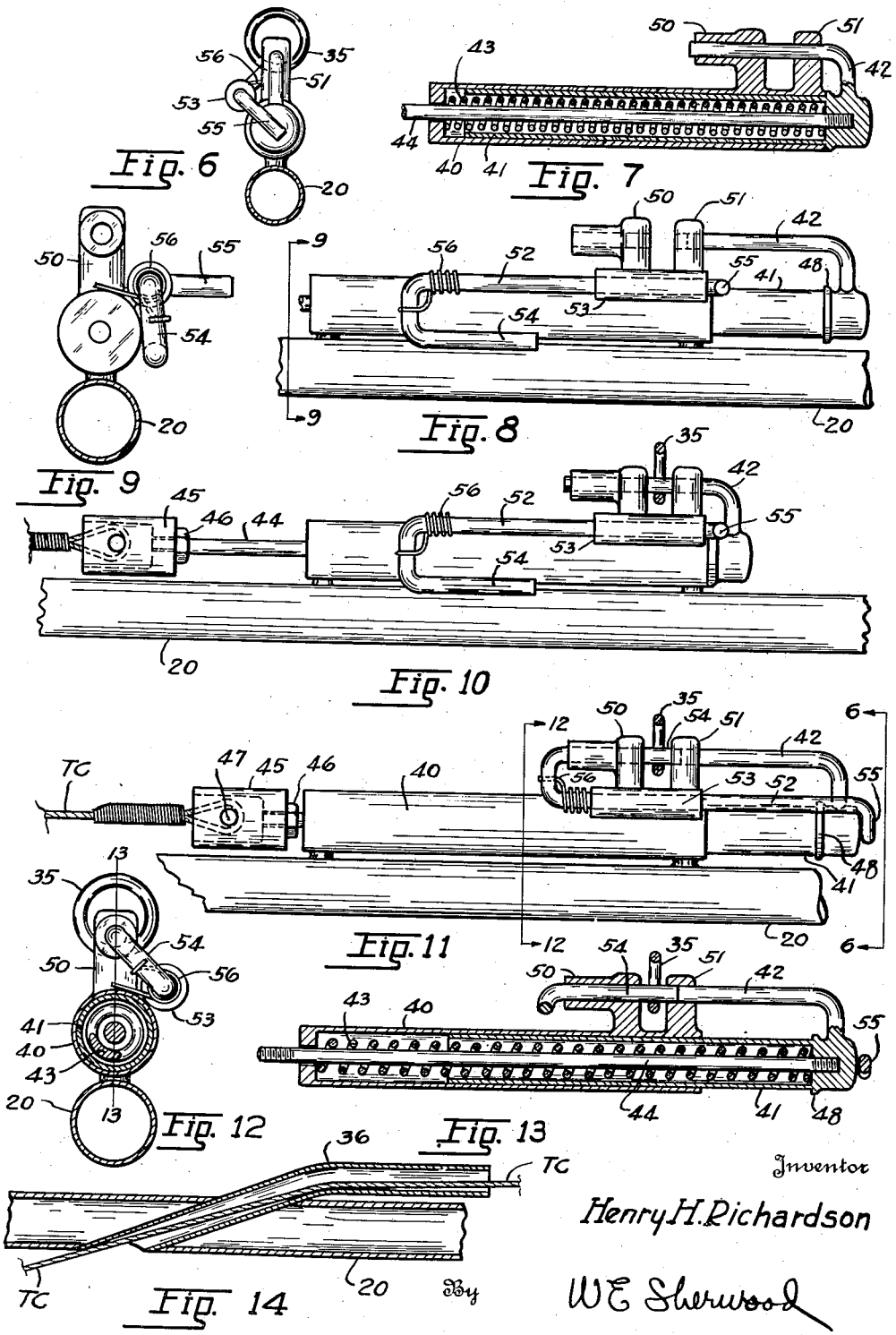

Dec. 15, 1936.  H. H. RICHARDSON  2,064,218
APPARATUS FOR DISPLAYING AERIAL SIGNS
Filed Jan. 4, 1934   4 Sheets-Sheet 3

Inventor
Henry H. Richardson
By W. E. Sherwood
Attorney

Dec. 15, 1936.    H. H. RICHARDSON    2,064,218
APPARATUS FOR DISPLAYING AERIAL SIGNS
Filed Jan. 4, 1934    4 Sheets-Sheet 4
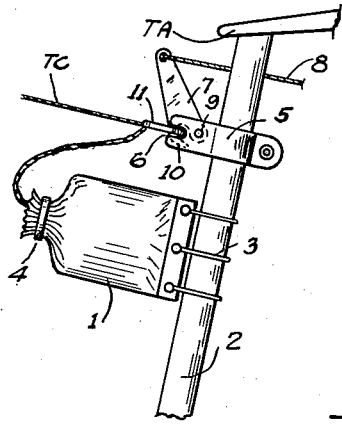
Fig. 24
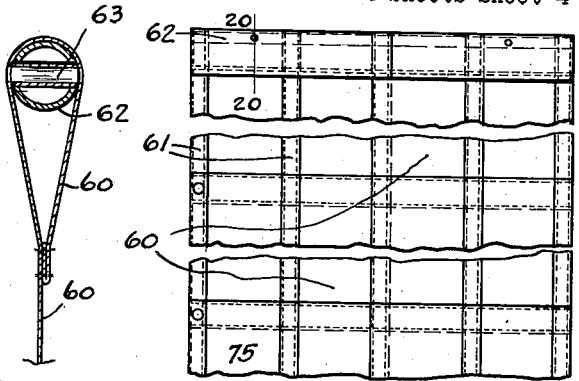
Fig. 20
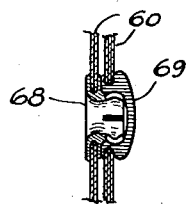
Fig. 22
Fig. 21
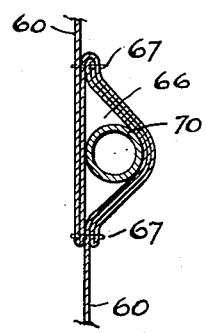
Fig. 23
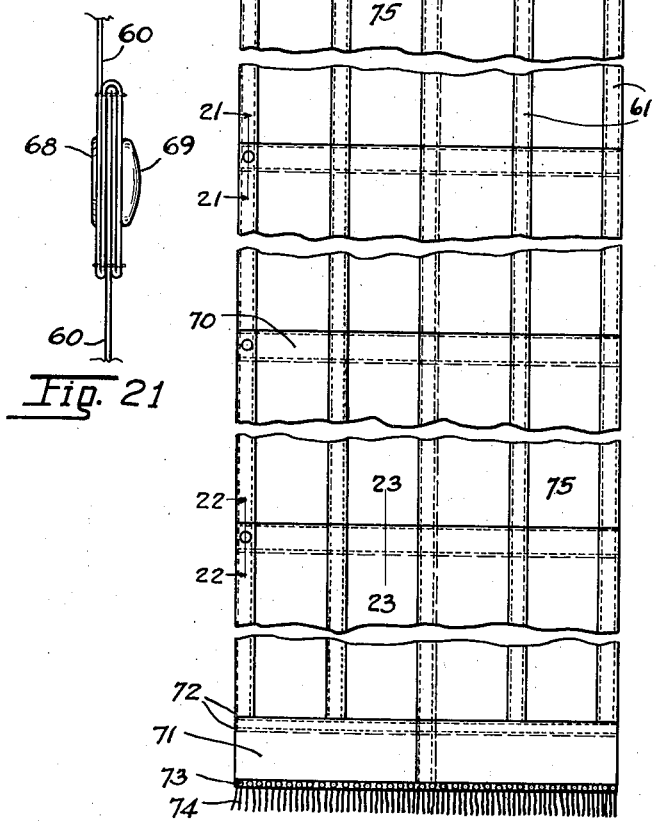
Fig. 19
Inventor
Henry H. Richardson
By W. E. Sherwood
Attorney Patented Dec. 15, 1936

2,064,218

UNITED STATES PATENT OFFICE 2,064,218

APPARATUS FOR DISPLAYING AERIAL SIGNS

Henry H. Richardson, Louisville, Ky.

Application January 4, 1934, Serial No. 705,198

10 Claims. (Cl. 40—127)

This invention relates to an improved apparatus for displaying aerial signs and embodies the desirable features of safety, reliability and distinctiveness.

Heretofore, certain disadvantages have been present in all forms of aerial display devices drawn through the air by means of towing agents. The primary disadvantage has resided in the danger involved in the display of the advertising banner. This danger was two-fold and involved both the operator of the towing agent and the residents of the locality over which the exhibition was conducted. More specifically, it has been necessary heretofore to provide separate means for holding the banner in a readable plane during the display period and this means has taken the form of a balloon or wind cone attached to the rear of the display banner. With such an arrangement, as the towing agent takes off from the ground a sudden, heavy drag is placed on the towing agent due to the resistance of such balloon or wind cone against the air and this drag occurs about the time a stalling speed of the towing agent is reached.

However, should such a display apparatus be able to take off safely from the ground, the danger to others on the ground still remains. In the event that an emergency occurs necessitating the release of the display apparatus, the display banner, towing connection and auxiliary parts will fall rapidly to the ground. Such may fall into a busy city street, across electric transmission lines or into moving traffic.

With aerial display apparatus of the conventional type much difficulty has been experienced in maintaining the display banner in a readable plane whereby it may be easily observed by persons at a lower elevation. In order to keep the banner in a readable plane, resort has been made to the use of balloons or wind cones at the rear of said banner involving the dangers hereinbefore set forth. Furthermore, it has been necessary to fly the banner immediately to the rear of the towing agent so that the slip stream from the towing agent tends to hold the banner in the desired plane. This practice sets up a severe whipping action in the banner and materially shortens its life. At the same time this practice limits the types of towing agents which may be used for the purpose and for this reason autogyros and air ships have been especially recommended as towing agents. When the towing connection extends horizontally to the rear of an airplane acting as a towing agent, a severance of the banner or towing connection may cause the control parts of the airplane to become fouled and instantly throw the airplane out of control.

Recent experiments have shown that it is desirable to use a stabilizing kite between the banner and the towing connection. With such a kite, the banner, if constructed properly, may be kept in the desired plane without the use of a separate lifting means at the rear of the same. The kite and banner may be flown at a plane above the slip stream of the towing means, thus permitting the use of any conventional means as a towing agent. An airplane can thus be used without the danger hitherto attendant upon its use when the banner was flown directly to the rear of the airplane.

The prime disadvantage in the use of the kite, however, is that an additional weight is involved and this will cause the display apparatus to fall even faster should an emergency dictate that the same should be cut loose from the towing agent. As a result of experimentation it has been found that even with the use of the smallest kite, banner and tow connection, the same will attain a velocity as high as 26 feet per second in falling to the ground.

Disadvantages have also been found in the type of stabilizing kite now in general use. Heretofore, it has been necessary to provide a multiplicity of bracing members in such kites and the points of attachment of the tow connection and banner to the kite has been limited to definite points located relatively high on the outline of the kite. Obviously, the many bracing members have added to the weight of the kite and to the cost of the same.

In the event that a metal tow line or a metal screen banner is used in the display apparatus, the possibility of the same dropping across an electric line has been ever present. Heretofore, no means other than manually cutting loose the tow line from the towing agent has been provided for emergencies. It is readily apparent that should the banner or the tow line become caught on a ground obstruction during the take off period, or should a whirlwind be encountered in flight, or should the towing agent be compelled to make a forced landing, the operator of the same would have difficulty in cutting away the display apparatus.

My invention is directed toward the elimination of these disadvantages and has for a prime object the teaching of a safe and reliable method of displaying aerial signs, including the features of safety in taking off from the ground, reliability in displaying the banner while in the air, safety in lowering the apparatus to the ground in the event of an emergency during the display period and safety in returning to the ground during a normal period of display operation.

A second object is the provision of a new and improved display apparatus embodying one or more parachutes attached to the apparatus and which may be placed in operation whenever an emergency so dictates.

A third object is the provision of a new and improved display banner construction.

A fourth object is the provision of a new stabilizing kite construction.

Another object is the provision of an improved tow connection means.

A further object is the provision of a simple, reliable, releasing mechanism for the parachute means.

A still further object is the provision of a new paint which is well adapted for use in depicting the advertising matter on the display banner.

Other objects and advantages of the invention, not at this time more particularly enumerated, will be clearly understood from the following description of the same when taken in connection with the drawings, in which:

Figure 1 is a plan view illustrating the arrangement of the display apparatus during a period of normal display operation;

Figure 2 is an elevation of the apparatus shown in Figure 1;

Figure 3 is a view showing the display apparatus immediately after the towing agent has been separated from the apparatus, the parachute being used at the end of the towing connection adjacent the towing agent;

Figure 4 is a view similar to Figure 3, the parachute being connected to the stabilizing kite;

Figure 5 is a view similar to Figure 3, illustrating the use of parachutes on both the kite and the towing connection;

Figure 6 is an end view of the parachute releasing mechanism taken on line 6—6 of Figure 11;

Figure 7 is a sectional view of a portion of the parachute releasing mechanism;

Figure 8 is an elevation of the parachute releasing mechanism in its opened position;

Figure 9 is a sectional view taken on line 9—9 of Figure 8;

Figure 10 is an elevation of the parachute releasing mechanism in its ready position during normal display operation;

Figure 11 is an elevation of the parachute releasing mechanism in its preliminary starting position;

Figure 12 is a sectional view taken on line 12—12 of Figure 11;

Figure 13 is a sectional view of the parachute releasing mechanism taken along line 13—13 of Figure 12;

Figure 14 is an enlarged sectional view of the kite framework showing the arrangement of the towing connection therein;

Figure 19 is a plan view of the display banner;

Figure 20 is a section on line 20—20 of Figure 19;

Figure 21 is an elevation along line 21—21 of Figure 19;

Figure 22 is a section on line 22—22 of Figure 19;

Figure 23 is a section on line 23—23 of Figure 19; and

Figure 24 is an elevation of the parachute holding and releasing means as applied to the towing agent.

Figure 15:
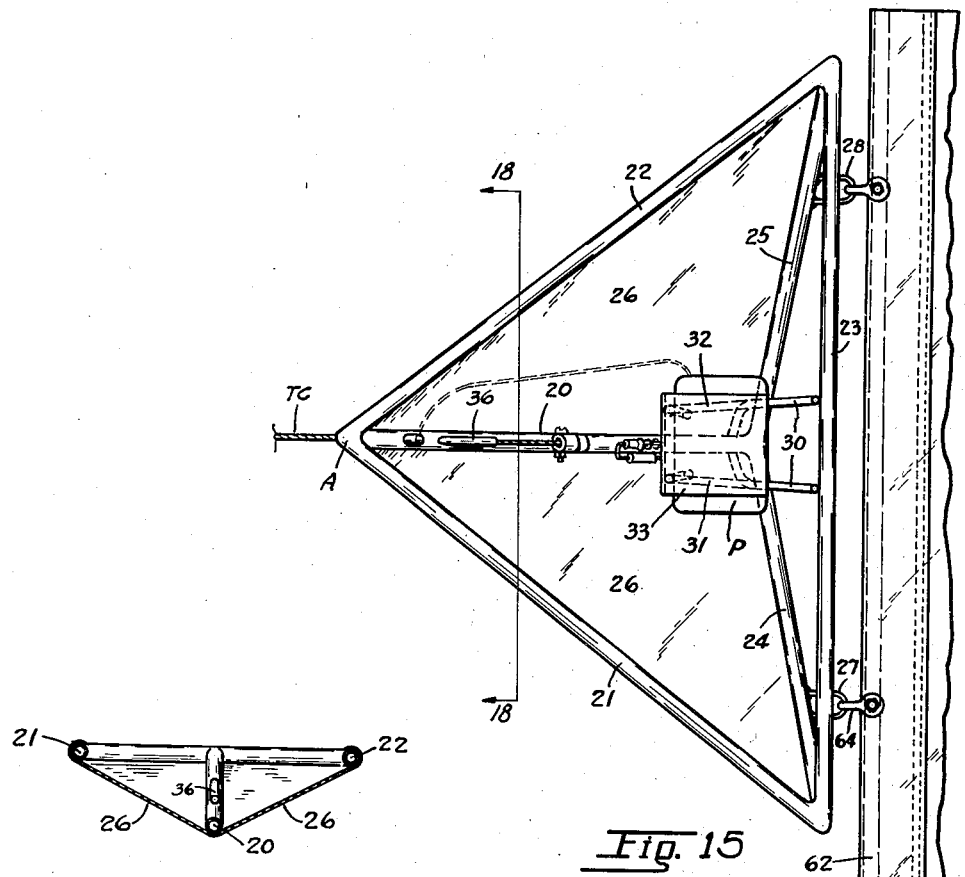
Figure 15 is a plan view of the stabilizing kite and a portion of the display banner.

In the practical embodiment of my invention the apparatus depicted in Figures 1 to 5 form the essential elements. As shown therein, a towing agent TA, which is illustrated as an airplane but which may take the form of any aircraft, carries a relatively long towing connection TC to which is attached a stabilizing kite K to which in turn is fastened a display banner B bearing advertising matter AM on its surface.

In order to render this method of aerial display safe and reliable, a parachute means P may be attached to the stabilizing kite as shown in Figures 1, 2 and 4. Likewise, a parachute means may be attached to the end of the towing connection adjacent the towing agent as shown in Figure 3. Moreover, should it prove to be necessary or desirable, parachutes may be attached to both the kite and the towing connection as shown in Figure 5. The advantages of these various embodiments will appear to better advantage as the description proceeds.

The apparatus employed when the parachute is attached to the towing connection is best shown in Figures 3, 5 and 24. In Figure 24, the towing connection TC is fastened to a parachute which is normally housed within a flexible container 1 closed at one end and securely fastened to a strut 2 on the towing agent TA by means of straps 3. The other end of container 1 is normally held closed by an elastic band 4. Affixed to strut 2 is a bracket 5 containing an open slot 6 and having pivoted therein a releasing arm 7 to which is attached a trip cord 8.

The releasing arm 7 turns on a pin 9 in bracket 5 and has a depending lip 10 which engages in slot 6. Attached to towing connection TC is a releasing ring 11 which enters into slot 6 and is normally held therein by the depending lip of arm 7. During normal display conditions a powerful pull is placed on ring 11 by the towing connection and due to its engagement with lip 10 of the releasing arm the apparatus is held securely in place.

When occasion demands that the parachute be released, the operator of the towing agent exerts a pull on trip cord 8 which acts on arm 7 with a large leverage about pin 9 and pulls lip 10 of arm 7 out of engagement with ring 11. Instantly, the slack in the towing connection is taken up and elastic band 4 expands allowing the pull of the towing connection to draw the parachute out of container 1. The parachute is then free to open and to take the position illustrated in Figure 3.

A similar arrangement without employing container 1 is provided for the towing agent when the parachute is to be used on the kite alone. By pulling trip cord 8 the pilot of the towing agent can slacken TC at any desired time, as for example when preparing to land after concluding an exhibition.

Similarly, when parachutes are used on both the kite and the towing connection the momentary slack occurring in TC when the trip cord is pulled and before the parachute fills, permits the releasing means on the kite to operate before the slack in TC is again taken up.

The construction of the new and improved stabilizing kite is made apparent by reference to Figures 15 to 18. The kite comprises a strong, rigid framework of tubular metal elements joined together by any suitable means, such as welding, and forms the general outline of a triangular pyramid. The framework consists of a member 20, known as the "back bone" of the kite, which is adapted to support the parachute releasing mechanism, hereinafter more fully described. Two similar side members 21 and 22 are joined to member 20 at one end so as to form a pyramid having an apex A and with the angle between members 21 and 22 being substantially greater than the angles between 21 and 20 or between 22 and 20. A cross member 23 joins the opposing ends of members 21 and 22 while member 24 joins the ends of 21 and 20 and a similar member 25 joins the ends of members 22 and 20.

The two sides of the pyramid thus formed by the framework and embraced between members 22 and 20 and 21 and 20 are covered by a light, strong fabric or similar material 26 and serves to establish a well balanced lifting surface for the kite whenever relative movement occurs between the kite and the surrounding air. Rigidly fastened to members 24 and 25 of the kite framework and extending rearwardly are two closed rings 27 and 28 providing openings into which the clevis members 64 of the display banner are hooked. Since the entire load drawn by the kite acts through rings 27 and 28 their location is of prime importance. As shown, these rings are symmetrically arranged with respect to the center of the framework and are located approximately 35% of the distance along members 25 and 24 below the cross member 23.

Figures 16, 18:
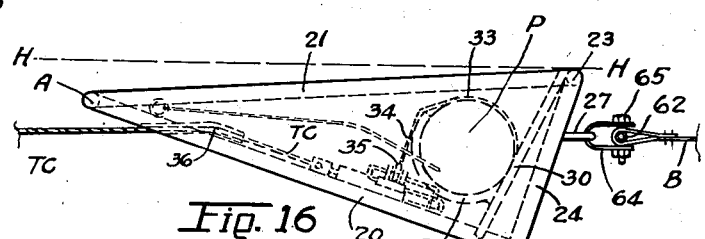
Figure 16 is an elevation of the kite and adjacent attached connections.
Figure 18 is a section on line 18—18 of Figure 15.

Due to this arrangement of the towing rings and to the location of the point of attachment of the towing connection to the kite, the kite in actual use tends to ride with its nose depressed at an angle from the horizontal as indicated in Fig. 16 wherein line H—H indicates the horizontal plane. This tendency of the kite to ride at an angle resolves the towing force into two components, one acting horizontally and pulling the kite behind the towing agent and one acting vertically and tending to raise the kite.

As a result of this vertical component the kite and attached banner fly above the slip stream of the towing agent, as shown in Fig. 2. This practice has many desirable features, namely that any type of aircraft may now be employed for towing since with the towing connection raised from the rear of the towing agent, such connection offers no interference with the controls of the towing agent. Also, by flying the kite and banner above the slip stream less whipping and rippling of the banner is experienced thus lengthening the useful life of the display apparatus and giving a more satisfactory exhibition of the advertising matter.

The kite framework also comprises a U-shaped member 30 which is rigidly attached at its open ends to the cross member 23 and at its curved end to the "back bone" member 20. This member 30 is inclined at an obtuse angle with the member 20 and in addition to bracing the kite framework also serves as a support for the parachute cradle members and as a guide rail over which the parachute rolls as it is released from its holding means.

Figure 17:
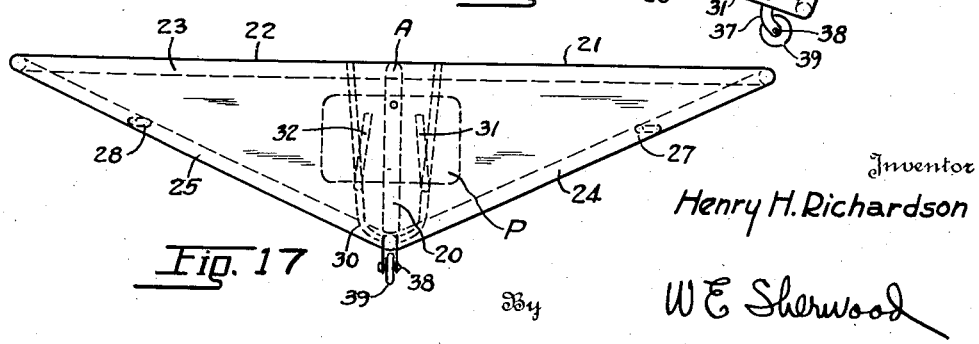
Figure 17 is a front end view of the kite when resting on an even keel.

Welded or otherwise suitably fastened to U-shaped member 30 are two curved cradle members 31 and 32, best shown in Fig. 17. These members serve to provide a resting place for the parachute and its cover.

Resting on cradle members 31 and 32 is a conventional parachute P (shown diagrammatically) attached to the kite framework at any desired place by means of the usual parachute cord and having a cover 33 for holding the parachute folds in proper place. The parachute cover has affixed thereto the usual resilient fastening straps 34 which in this instance terminate in a ring 35 which engages with the pin 42 of the parachute releasing mechanism as best shown in Figures 6 to 13.

Although the parachute as shown is adapted to pass over the rear of the kite in its unfolding operation, it is obvious that such a parachute could be positively thrown over the front or sides of the kite when released from its holding means and such an alternative construction is to be considered as being within the purview of my invention.

Passing through the "back bone" member 20 of the framework and extending into the interior of the kite is a hollow cylindrical tube 36 through which the towing connection TC passes and which serves to determine the point of attachment of the towing connection to the kite structure. It will be noted that this point of attachment is some distance below the apex of the pyramid and along the center of the framework. As best shown in Fig. 14, the tube 36 guides the towing connection and prevents it from binding on the framework as it enters the kite.

Extending exteriorly of the kite and attached to member 20 is a pair of brackets 37 through which passes an axle 38. Mounted on said axle is a wheel 39 which serves to keep the kite off the ground and enables it to take off without damage at the beginning of the display period. A conventional skid shoe may be used in place of the wheel if under special circumstances it should prove to be more desirable. On a smooth, dry landing field the use of wheel 39 serves to give a smooth take off and lessens the wear on the kite.

Figures 6 to 13 show the construction of the parachute releasing mechanism as used on the kite. Attached to the "back bone" member 20 on the interior of the kite as best shown in Figure 11 is a stationary hollow cylinder 40 telescoping within which is a hollow cylinder 41, closed at its outer end and having rigidly affixed thereto a parachute releasing pin 42. Contained within cylinders 40 and 41 is a compression spring 43 shown in Figure 13 which acts constantly against the closed ends of these cylinders. A threaded rod 44 is screwed into the closed end of movable cylinder 41 and at its other end of the rod screws into a hollow block 45 and is securely fastened therein by a nut 46. Passing diametrically through block 45 is a retaining pin 47 over which the towing connection TC is passed, said towing connection then being wrapped and fastened adjacent the open end of block 45.

Movable cylinder 41 carries on its exterior surface a collar 48 which engages with the open end of cylinder 40 when spring 43 is sufficiently compressed. From this description it is apparent that any tension placed upon the towing connection is transmitted to cylinder 41 which moves inwardly and compresses the spring. Conversely, any slack in the towing connection permits the spring to expand, moving cylinder 41 and releasing pin 42 outwardly. The movement of the cylinder 41 inwardly is limited by the engagement of collar 48 with the open end of stationary cylinder 40 and the movement of cylinder 41 outwardly is limited by the engagement of nut 46 against the outer end of cylinder 40. This construction permits the use of a spring 43 of considerably less tension than the tension borne by the towing connection TC during display operation. Spring 43 need be only heavy enough to insure a positive movement of the releasing pin 42. After the tension is placed on spring 43 during the initial starting period, the engagement of collar 48 with the end of stationary cylinder 40 causes any additional tension in TC to be exerted directly on the kite framework.

Upstanding from the stationary cylinder 40 is a pair of ears 50 and 51, having aligned holes therein and being spaced to provide room for the insertion of the parachute releasing ring between the ears. These ears serve to guide and retain the releasing pin 42 and the releasing pin locking member 52. Extending from the cylinder 40 at an angle from ears 50 and 51 is a bracket 53 having a bore therein for the reception of the releasing pin locking member 52.

Rigidly attached to movable cylinder 41 and extending parallel thereto is a releasing pin 42 which is aligned for travel in ears 50 and 51. Loosely mounted in bracket 53 is the releasing pin locking member 52 having one end portion 54 bent so as to engage in the holes in ears 50 and 51 and to travel on the same axis as releasing pin 42. At its other end, locking member 52 is bent downwardly as at 55 to extend into the path of travel of movable cylinder 41 and to abut against such cylinder. As explained hereinafter the releasing pin locking member 52 is positioned manually in its locking position shown in Figures 11, 12, and 13 prior to beginning the aerial display. This setting of the locking member may be accomplished by manually compressing spring 43 within cylinders 40 and 41, turning the locking member 52 against the action of torsion spring 56, inserting end 54 of the locking member into ears 50 and 51 and ring 35 and then hooking end 55 of the locking member behind the outer end of movable cylinder 41. When this is done the pressure on spring 43 is released causing the movable cylinder 41 to move to the rear in engagement with end 55 of the locking member and to hold the end 54 of the said locking member in engagement with the parachute ring as shown in Figures 11, 12 and 13. Then when the pull of the towing agent is transmitted to the movable cylinder 41 and the spring 43 is again compressed during the display operation, the end 54 of the locking member is pushed out of engagement with the parachute ring and the ear 50 by means of the releasing pin 42 attached to the movable cylinder 41, the spring 56 turns the end 54 of the locking member out of alignment with the ear 50, and at the same time the other end 55 of the locking member is moved out of the path of travel of movable cylinder 41. In this way the releasing mechanism assumes a ready position whereby any appreciable slackening of the towing connection will immediately cause spring 43 to move cylinder 41 and releasing pin 42 to the rear thus causing the parachute to be released.

Releasing pin 42 is made of such length that it is continually in engagement with ear 51 and thus prevents cylinder 41 from turning on its axis. Locking member 52, however, is made of such a length that at times when cylinder 41 is moved far into stationary cylinder 40 by the pull of the towing connection, end 54 of member 52 moves out of ear 50. One end of a torsion spring 56 is fastened to locking member 52, the other end of the spring bearing against cylinder 40 at all times. When, therefore, the end 54 of the locking member is moved out of ear 50 by the movement of pin 42 actuated by the towing connection, torsion spring 56 becomes effective to turn locking member 52 on its axis, thus throwing end 54 out of alignment with ear 50 and turning end 55 out of the path of travel of cylinder 41, as is best shown in Figs. 8, 9 and 10.

The parachute releasing mechanism is then in a ready position and will be maintained in this position until an appreciable slack occurs in towing connection TC. When this slack occurs, compression spring 43 moves cylinder 41 carrying with it releasing pin 42 outwardly as shown in Fig. 8. As soon as the end of releasing pin 42 moves into ear 51 the parachute ring 35 is liberated and flies outwardly thus permitting the parachute proper to be opened.

Figures 19 to 23 show the construction of my new and improved aerial display banner. The banner is formed of any suitable flexible material such as rayon, a nonsilk, cheesecloth, unbleached domestic cloth or the like. Since the banner is to provide a surface upon which advertising matter is to be displayed and since such advertising matter will likely be changed from time to time, I have found it necessary to develop a new type of paint for depicting the advertising matter on said banner. It is found that a paint composed of drop-black (Frankfort black), condensed milk and water forms an excellent preparation for this purpose. Such a paint sets out the advertising matter in a clear and distinctive manner, will not blur in damp or rainy weather and yet can be easily removed by the usual laundering processes.

As shown in Figure 19, the banner comprises one or more elongated strips of fabric 60 to which is securely sewed a number of longitudinally extending flexible tapes 61. At the head of the banner the fabric is stretched over a cylindrical metal tube 62 having holes 63 therethrough. Passing through these holes is a clevis 64 held securely in tube 62 by a bolt and nut 65, the clevis passing through towing rings 27 and 28 attached to the kite framework.

Spaced along the banner surface is a plurality of transverse pockets 66 located preferably on the upper side of the banner, such pockets being formed as an integral part of the banner fabric. As best shown in Fig. 23 the fabric is folded a number of times and is sewed at each side of the pocket by a stitch 67. These pockets are preferably closed along one side of the banner by sewing the fabric folds together while at the other side of the banner the pockets are adapted to be closed by means of any conventional fastener such as the glove fastener shown in Fig. 22. This fastener comprises a male portion 68 securely attached to one fold of the fabric and a female portion 69 securely fastened to another fold of the fabric.

Adapted for insertion into pockets 66 is a number of light bracing members 70 made of any light, strong substance such as bamboo. When these are inserted into the pockets and the glove fasteners are closed, members 70 are held in place and give a lateral stability to the banner.

It will be noted in Figs. 1, 2 and 19 that the pockets and bracing members are relatively close together at the head of the banner and relatively far apart at the tail of the banner. For example, it has been found by experiment that the banner can best be maintained in a horizontal flying position if the bracing members at the head of the banner are spaced approximately 3 feet 6 inches apart and those at the rear of the banner are spaced approximately 10 feet 6 inches apart.

In towing any banner rapidly through the air a greater or less whipping action is set up in such banner. In order to absorb such a whipping action it has been found desirable to provide the banner with a kind of false tail on which no advertising matter is placed. In the present case a false tail 71 is formed as an integral part of the banner by making a strong double stitch 72 transversely of the banner adjacent the tail of the same.

At the end of the banner a strong hemstitch 73 is provided and a fringe 74 extends from the hemstitch. The fringe 74 absorbs most of the whipping action of the banner and the false tail 71 takes up the remainder of such whipping action.

Due to the presence of the tube 62 and the bracing members 70 the banner is kept stretched out and insures a proper display of its advertising matter. The bracing effect of members 70 and of the tapes 61 relieve the intermediate portions 75 of the banner from strain and adds to the life of the banner.

Since no fastening holes are made in the banner fabric, no weak spots in the fabric can develop as is the case in the present practice. This insures against the banner breaking apart in flight as it would otherwise be likely to do and by means of this improved banner a safer operation results. This banner can be used repeatedly for different exhibitions. By merely opening the fasteners, removing bracing members 70 and removing towing tube 62 the banner can be folded up and taken to a laundry. By the use of my improved washable paint, a banner can be easily washed and repainted with different advertising matter in a minimum of time.

This new and improved banner construction forms the subject matter of my divisional and copending application, Serial No. 55,008, filed Dec. 18, 1935, in which application the advantages and constructional features of the banner are more particularly set forth.

In conducting an aerial display with the above apparatus the following operation would take place. An elongated towing connection TC is fastened to a towing agent in somewhat the same manner as shown in Fig. 24. Assuming that a parachute is to be used only on the kite, the parachute releasing mechanism is then manually set prior to the take-off as described above.

The banner B with its bracing members 70 fastened in place and with its tube 62 fastened to the kite is stretched out on the ground behind the kite. When all is in readiness the operator of the towing agent starts the engine of the same and the blast of air passing backward raises the kite up on its wheel and also lifts the banner B from the ground. This strong blast of air acting on the large banner then compresses the spring 43 and holds it in the compressed state. As the towing agent takes off the resistance of the banner and kite increases but little and no sudden resistance is placed on the towing agent as it approaches its stalling speed as is the case with the banners which use balloons or wind cones.

As the tension is increased in TC spring 43 is further compressed and collar 48 engages the end of stationary cylinder thus transmitting the pull of the towing agent directly to the kite framework. As spring 43 is completely compressed releasing pin 42 moves over into the position shown in Fig. 10, forcing end 54 of locking member 52 out of ear 50 whereupon torsion spring 56 throws the locking end 55 out of the path of movable cylinder 41 and the releasing mechanism thereupon assumes its ready position. So long as an appreciable tension is maintained in towing connection TC the parachute is held closed. However, when the operator slackens the tension by pulling the trip cord 8 the apparatus immediately takes the position shown in Fig. 3. Experience has shown that there is always sufficient tension in TC during all conditions of flight to positively hold the releasing mechanism in its closed position. As explained heretofore, the trip cord 8 and its cooperating releasing arm 7 is used regardless of whether the parachute is located at the towing agent, at the kite or at both places. In the event that the parachute is located only at the kite (see Figure 4) the towing connection TC will terminate in ring 11 at one end and in block 45 (Figure 10) at the other end and the pull of this connection will be exerted at these two points. The release of trip cord 8 will therefore free the entire display apparatus from the towing agent, slacken the pull of the towing connection and permit the parachute releasing mechanism to function.

Since the parachute cannot open at an inopportune time and yet can be opened surely and quickly whenever the operator so desires, a safe method of operation results. Whatever contingencies may arise in taking off, in flight or in preparing to land can thus be readily met.

In the event that a single parachute is to be used on the towing connection alone as shown in Figures 3 and 24 the same operation will be followed except that no releasing mechanism or parachute is provided for the kite. In such a case the towing connection is rigidly attached to the kite framework.

When parachutes are used on both the kite and the towing connection as shown in Figure 5, a pull on the trip cord 8 will provide enough slack in TC to permit the parachute releasing mechanism on the kite to operate before the parachute on the towing connection fills out and takes up the slack in such towing connection.

Experiments have shown that by the use of my improved aerial apparatus the rate of descent of the same can be reduced to a very low value. Moreover, the danger to residents of a locality over which an exhibition is conducted is reduced to a minimum since the relatively heavy kite is held up by a parachute during the descent.

Whereas the parachutes have been shown only diagrammatically, it is to be understood that parachutes of any conventional type may be used in this combination. For example, when the display apparatus assumes large proportions it may become necessary to use pilot parachutes in connection with large main parachutes and it is my intention to use such an apparatus whenever occasion demands.

Having thus disclosed the preferred form of the invention and having described the useful cooperation between the towing agent, towing connection, kite, banner, and parachutes, it is obvious that the same cooperation may be embodied in similar apparatus without departing from the scope of my invention. Therefore, it is my intention to cover by the appended claims such changes as may reasonably be included within the scope thereof.

I claim:

1. In an aerial display device, the combination of a towing agent, a towing connection, an aerial sign, a parachute releasing means interposed between the towing agent and the sign and subject to the pull of the towing connection, said releasing means being held in a ready position while the display is in normal flight and being adapted to operate automatically whenever the pull of the towing connection is slackened, a parachute attached to the display device intermediate the towing agent and the sign, said parachute being free of the pull of the towing connection and having a ring engaging with the releasing means whereby the parachute may open whenever the releasing means is operated.

2. In an aerial display device, the combination of a towing agent, a stabilizing means, an aerial sign attached to the stabilizing means, a towing connection, a parachute releasing means carried by the stabilizing means and subject to the pull of the towing connection, said releasing means being held in a ready position while the display is in normal flight and being adapted to operate automatically whenever the pull of the towing connection is slackened, a parachute attached to the stabilizing means and free from the pull of the towing connection, said parachute having a ring engaging with the releasing means whereby the parachute may be opened when the releasing means is operated.

3. A stabilizing kite comprising in combination, a framework of bracing members forming the outline of a pyramid, a fabric surface covering two sides of the pyramid from apex to base, a towing connection extending through the framework near the apex of the pyramid, a plurality of load carrying points attached to the framework at the base of the pyramid, a parachute support means affixed to the framework and open at the uncovered side of the pyramid, a parachute resting on the support means and attached to the kite independently of the towing connection, said parachute having a ring engaging with a parachute releasing means, a parachute releasing means mounted on the framework and joined to the towing connection whereby it may be moved into a ready position by the pull of the towing connection and may automatically release the parachute ring when the pull of the towing connection is slackened.

4. In an aerial display device, the combination of a towing agent, an aerial sign, a parachute releasing means interposed between the towing agent and the sign and subject to the pull of the towing agent, said releasing means being held in a ready position while the display is in normal flight and being adapted to operate automatically whenever the pull of the towing agent is slackened, a parachute independently connected to the display device and having a ring engaging with the releasing means whereby the parachute may open automatically whenever the releasing means is operated by a slackening of the towing agent pull.

5. In an aerial display device, a parachute releasing mechanism comprising a releasing member, resilient means normally forcing the member to its open position, means connecting the member to a towing agent whereby the releasing member is held in its closed position while the towing agent exerts a pull, a parachute connected to the display device and mounted adjacent the releasing mechanism, said parachute having a ring engaging with the releasing mechanism, a locking member detachably secured in alignment with the releasing member and cooperating therewith to hold the parachute ring prior to inception of the towing agent pull and means to move the locking member out of alignment with the releasing member when the towing agent exerts a pull on said releasing member, whereby the resilient means may automatically move the releasing member to its open position and release the parachute ring when the pull of the towing agent is slackened.

6. In a parachute equipped aerial display, a parachute releasing means having in combination a parachute ring, a releasing member adapted to engage with said ring in a ready position, resilient means acting to move the releasing member to its open position, means to apply a source of power holding the releasing member in a ready position, a locking pin detachably secured in the path of the releasing member and having at one end a straight portion adapted to engage with the parachute ring and at the other end an angularly disposed portion adapted to engage with the releasing member and to hold the same against the action of the resilient means, and means to disengage the locking pin from cooperation with the releasing member after the said member is moved to ready position in engagement with the parachute ring whereby the releasing member may move automatically to its open position and release the parachute ring when the source of power is diminished.

7. In combination with a parachute equipped aerial display drawn by a towing agent, a parachute releasing mechanism held in a ready position by the pull of said towing agent, a parachute having a member engaging with the releasing mechanism in said ready position and resilient means coacting with the releasing mechanism and adapted to be compressed by the pull of the towing agent whereby said resilient means may move said releasing mechanism automatically to an open position and disengage the parachute upon a release of the towing agent pull.

8. In combination with a parachute equipped aerial display drawn by a towing agent, a parachute releasing mechanism comprising a releasing member subject to the pull of the towing agent, resilient means normally holding said member in open position, a detachable locking member engaging with the releasing member to retain the parachute prior to inception of the towing agent pull, and means to move the locking member out of engagement with the releasing member when the towing agent pull moves the releasing member into ready position in engagement with the parachute whereby the resilient means may move the releasing member into open position and automatically release the parachute upon a slackening of the towing pull.

9. A stabilizing kite for a parachute equipped aerial display comprising, a framework forming the outline of a pyramid, a fabric surface upon two sides of the pyramid, a parachute releasing means mounted upon the framework, a parachute mounted upon the framework having a member engaging with the releasing means, and a towing connection extending through the framework near the apex of the pyramid and connected to the releasing means whereby the pull of said towing connection may be applied to the releasing means to retain the parachute member.

10. In a parachute equipped aerial display adapted to fly above its towing means, a stabilizing kite comprising a framework forming the outline of a pyramid, a fabric surface upon two sides of the pyramid, a parachute releasing means mounted upon the framework, a parachute mounted upon the framework and having a member engaging with the releasing means, a towing connection extending through the framework below the apex of the pyramid and connected to the releasing means whereby the pull of said towing connection may be applied to the releasing means to retain the parachute member and load carrying points attached to the base of the pyramid causing the kite to fly with its nose depressed and to carry the display above the flight of the towing means.

HENRY H. RICHARDSON.